US008255100B2

(12) United States Patent
Schimert

(10) Patent No.: US 8,255,100 B2
(45) Date of Patent: Aug. 28, 2012

(54) DATA-DRIVEN ANOMALY DETECTION TO ANTICIPATE FLIGHT DECK EFFECTS

(75) Inventor: James Schimert, Seabeck, WA (US)

(73) Assignee: The Boeing Company, Chicago, IL (US)

( * ) Notice: Subject to any disclaimer, the term of this patent is extended or adjusted under 35 U.S.C. 154(b) by 1204 days.

(21) Appl. No.: 12/038,057

(22) Filed: Feb. 27, 2008

(65) Prior Publication Data

US 2009/0216393 A1 Aug. 27, 2009

(51) Int. Cl.
*G06F 11/00* (2006.01)

(52) U.S. Cl. .......................................... 701/14; 702/183

(58) Field of Classification Search .................... 701/14, 701/29, 30, 32, 33–35, 3, 29.1, 29.2, 29.4, 701/29.6, 31.8; 714/25, 26, 46, 11, 712; 702/183, 185

See application file for complete search history.

(56) References Cited

U.S. PATENT DOCUMENTS

| | | | | |
|---|---|---|---|---|
| 5,161,158 | A * | 11/1992 | Chakravarty et al. | 714/26 |
| 6,591,182 | B1 * | 7/2003 | Cece et al. | 701/100 |
| 6,751,536 | B1 * | 6/2004 | Kipersztok et al. | 701/29 |
| 2010/0241293 | A1 * | 9/2010 | Ganguli et al. | 701/4 |

OTHER PUBLICATIONS

Ge, Z. et al. "Process Monitoring Based on Independent Component Analysis—Principal Component Analysis (ICA—PCA) and Similarity Factors." Ind. Eng. Chem. Res. 2007, vol. 46, pp. 2054-2063, Mar. 2, 2007.

Hyvärinen, A. et al. "Independent Component Analysis." John Wiley & Sons, Inc. 2001, pp. 1-12.

Kano, M. et al. "Monitoring Independent Components for Fault Detection." AlChE Journal, Apr. 2003, vol. 49, No. 4, pp. 969-976.

Lee, J.-M. et al. "Statistical Process Monitoring with Independent Component Analysis." Journal of Process Control, 2004, vol. 14, pp. 467-485.

Westerhuis, J. et al. "Generalized Contribution Plots in Multivariate Statistical Process Monitoring." Chemometrics and Intelligent Laboratory Systems, 2000, vol. 51, pp. 95-114, Aug. 16, 1999.

Bowman, Adrian W., et al., Applied Smoothing Techniques for Data Analysis, The Kernel Approach with S-Plus Illustrations, Clarendon Press, Oxford, 1997, Preface, Table of Contents, pp. 1-17.

Kourti, Theodora, et al., "Multivariate SPC Methods for Process and Product Monitoring", Journal of Quality Technology, vol. 28, No. 4, Oct. 1996, pp. 409-428.

* cited by examiner

*Primary Examiner* — Dalena Tran

(74) *Attorney, Agent, or Firm* — Charles L. Moore; Moore & Van Allen PLLC

(57) ABSTRACT

A method for data-driven anomaly detection may include monitoring a plurality of parameters associated with a plurality of subsystems of a system. The method may also include collecting data corresponding to each of the plurality of parameters from the plurality of subsystems and generating monitoring quantities based on the data. The method may also include determining if any quantities in the monitoring quantities exceed a predetermined limit. A contribution plot may be generated corresponding to each of the parameters in response to any of the quantities exceeding the predetermined limit. The method may further include determining which parameter is likely to cause an effect based on the contribution plot.

29 Claims, 12 Drawing Sheets

1000
1020 DISPLAY
1022 I/O DEVICE(S)
1002 PROCESSOR
1004 DATA-DRIVEN ANOMALY DETECTION MODULE
1006 EXTRACT INITIAL TRAINING DATA
1008 REFINE DATA; FIT MODELS; GENERATE NOC MODEL; DETERMINE LIMITS FOR MONITORING CHARTS
1010 DATA COLLECTION
1016 DETECT LIMITS EXCEEDED; GENERATE ALERT
1018 GENERATE AND PRESENT CONTRIBUTION PLOTS
1014 SYSTEM, SUBSYSTEM, ETC.
1012 SENSOR(S)
1014 SYSTEM, SUBSYSTEM, ETC.
1012 SENSOR(S)

DATA-DRIVEN ANOMALY DETECTION TO ANTICIPATE FLIGHT DECK EFFECTS

FIELD

Embodiments of the present invention relate to detecting anomalies associated with the operation of equipment, such as aircraft, other types of vehicles or other equipment, and more particularly to a system and method for detecting or predicting an anomaly to anticipate a flight deck effect on an aircraft or an alarm on another type of equipment.

BACKGROUND OF THE INVENTION

Modern aircraft are complex equipment including multiple systems and subsystems that are monitored for proper operation and performance of the aircraft. When one of these systems is not functioning or not functioning properly, a flight deck effect may result. The flight deck effect may be an alarm or other indication on an instrument panel of the aircraft. The flight deck effect can result in grounding the aircraft for unplanned maintenance resulting in loss of business as well as other undesirable results for the aircraft owner or operator. Accordingly, an ability to anticipate or predict flight deck effects before they occur and to identify the system, subsystem, component or group of systems, subsystems or components that may cause a flight deck effect would be highly desirable.

BRIEF SUMMARY OF THE INVENTION

In accordance with an embodiment of the present invention, a method for data-driven anomaly detection may include monitoring a plurality of parameters associated with a plurality of subsystems of a system. The method may also include collecting data corresponding to each of the plurality of parameters from the plurality of subsystems and generating a set of monitoring quantities based on the data. The method may additionally include determining if any monitoring quantities exceed a predetermined limit. If so, an alert is generated, and a contribution plot shows the relative contribution of each of the parameters to the alert. The method may further include determining which parameter and accordingly which subsystem or component is likely to cause an effect based on the contribution plot.

In accordance with another embodiment of the present invention, a method for data-driven anomaly detection may include statistically analyzing performance data from a plurality of aircraft systems in relation to previously collected baseline performance data from the plurality of aircraft systems. The method may also include detecting any anomalies based on the statistical analysis to permit correction prior to any flight deck effect.

In accordance with a further embodiment of the present invention, a data-driven method for detecting anomalies in sensor data from an aircraft may include two main steps. The first step may define data sets collected under normal operating conditions from a plurality of aircraft systems, and determines limits. Empirical models may be applied to reduce a possible high dimension of sensor data. These models and limits may be called "baseline" models and limits. The second step may detect any anomalies in new sensor data by projecting onto the baseline models, and comparing monitored quantities to baseline limits. At any time, if the baseline limit is exceeded, an alert is generated. Otherwise the observation is considered normal. A decision whether the baseline limit is exceeded may be made for all the models developed in the first step. These decisions may be consolidated to produce a consensus decision. A consensus decision or alert and interpretation using contribution plots permits correction prior to any flight deck effect.

In accordance with another embodiment of the present invention, a system for data-driven anomaly detection may include a processor and a data collection unit to collect data from a plurality of subsystems of an apparatus. The system may also include a data-driven anomaly detection module operable on the processor. The data-driven anomaly detection module may statistically analyze performance data from the plurality of subsystems in relation to previously collected baseline performance data from the plurality of subsystems. The module also detects any anomalies based on the statistical analysis to permit correction prior to any future operational effects associated with the apparatus.

In accordance with another embodiment of the present invention, an aircraft may include a plurality of aircraft systems, such as flight control systems, environmental control systems and other systems. Each aircraft system may provide sensor data. The aircraft may additionally include a data-driven anomaly detection system to statistically analyze sensor data from the aircraft systems in relation to previously collected baseline performance data from these aircraft systems. The data-driven anomaly detection system may detect any anomalies based on the statistical analysis to permit correction prior to any flight deck effects.

In accordance with another embodiment of the present invention, a computer program product for data-driven anomaly detection may include a computer usable medium having computer usable program code embodied therewith. The computer usable medium may include computer usable program code configured to statistically analyze data from a plurality of subsystems of a system in relation to previously collected baseline data from the plurality of subsystems. The computer usable medium may also include computer usable program code configured to detect any anomalies based on the statistical analysis to permit correction prior to any operational effects associated with the system.

Other aspects and features of the present invention, as defined solely by the claims, will become apparent to those ordinarily skilled in the art upon review of the following non-limited detailed description of the invention in conjunction with the accompanying figures.

DETAILED DESCRIPTION OF THE INVENTION

Figure 1:
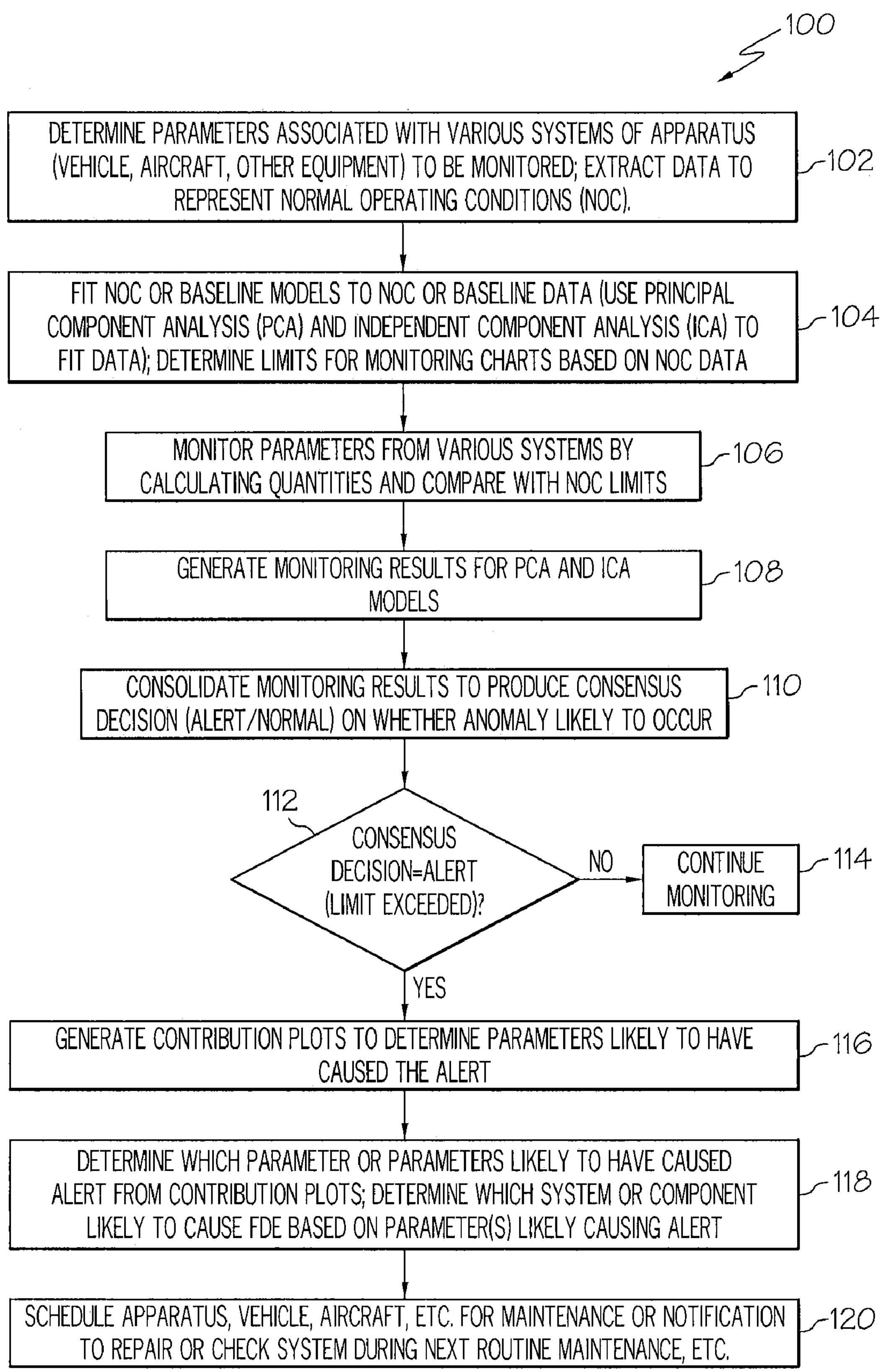
FIG. 1 is a flow chart of an example of a method for data-driven anomaly detection in accordance with an embodiment of the present invention.

The following detailed description of embodiments refers to the accompanying drawings, which illustrate specific embodiments of the invention. Other embodiments having different structures and operations do not depart from the scope of the present invention.

As will be appreciated by one of skill in the art, the present invention may be embodied as a method, system, or computer program product. Accordingly, portions of the present invention may take the form of an entirely hardware embodiment, an entirely software embodiment (including firmware, resident software, micro-code, etc.) or an embodiment combining software and hardware aspects that may all generally be referred to herein as a "circuit," "module," "unit," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a tangible medium such as a portable computer diskette, a hard disk, a random access memory (RAM), a read-only memory (ROM), an erasable programmable read-only memory (EPROM or Flash memory), an optical fiber, a portable compact disc read-only memory (CD-ROM), or other tangible optical or magnetic storage devices; or transmission media such as those supporting the Internet or an intranet. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

While the embodiments of the present invention may be described herein with reference to an aircraft or aerospace vehicle, the embodiments of the present invention may also be applicable to other vehicles, such as watercraft or terrestrial vehicles, as well as other apparatus or equipment to which the methods and systems described herein may be adapted or used.

FIG. 1 is a flow chart of an example of a method 100 for data-driven anomaly detection in accordance with an embodiment of the present invention. In block 102, parameters associated with various systems of an apparatus that are desired to be monitored may be determined. As used herein, a system may also be a subsystem, component part of other element of a larger system or unit. The apparatus may be a vehicle, such as an aircraft, watercraft, land vehicle or any other piece of equipment to which the present invention may be applicable.

Data representing normal operating conditions (NOC) may also be extracted or collected in block 102. As described in more detail with reference to FIGS. 2A and 2B, sensor data from the various systems, such as flight control systems and environmental systems associated with an aircraft, may be collected and processed to generate training data sets of sensor data corresponding to a baseline or normal operating conditions (NOC) for specific parameters of interest. New data from various aircraft systems may then be compared to thresholds determined from the previously collected NOC data or baseline data. Anomalies, faults or other conditions may be detected to permit correction prior to any flight deck effect. As described herein, the statistical analysis of the data may include multivariate process monitoring techniques to account for correlation between the different parameters and to generate an alert when relationships between the parameters change, as well as when mean levels of individual parameters may change.

In block 104, NOC models or baseline models may be fit to NOC data or baseline data. Principal component analysis (PCA) and independent component analysis (ICA) are known techniques that may be used to reduce the dimension of NOC or baseline data. PCA and ICA are described in more detail below. A NOC model represents data under normal operating conditions. Monitoring quantities are calculated at each time by applying NOC models to the data collected at that time.

Figure 7:
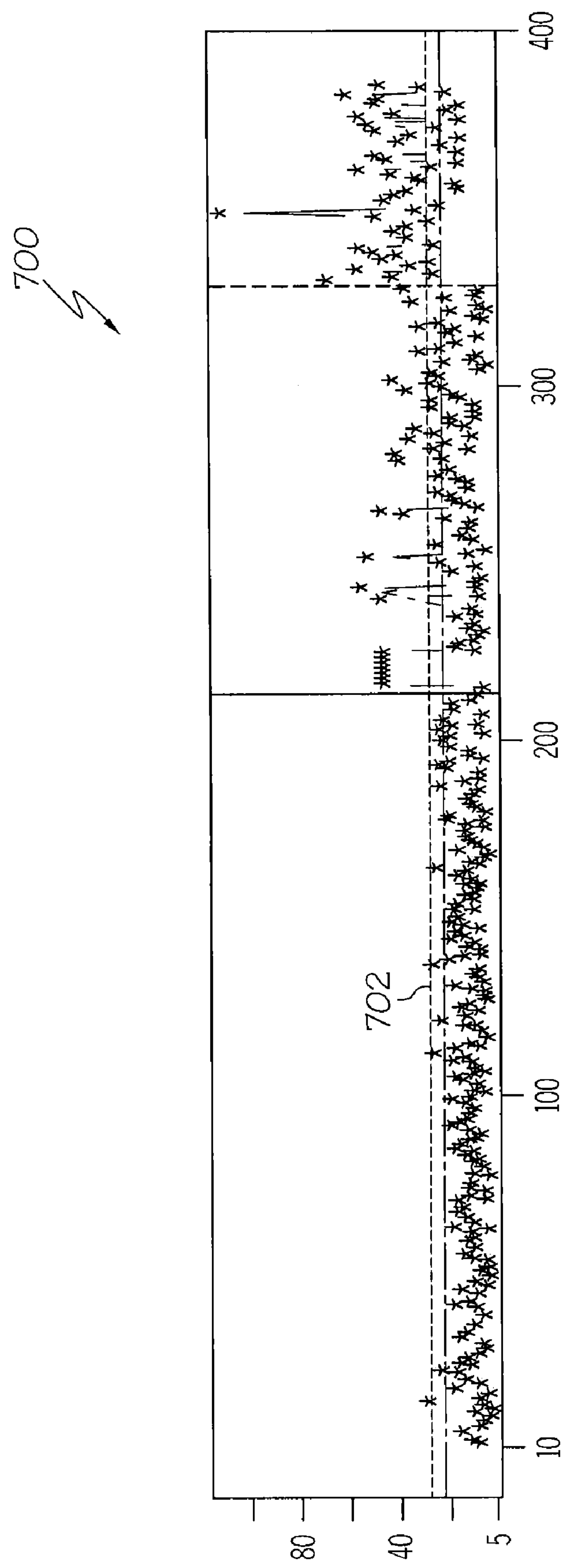
FIG. 7 is an illustration of an example of a monitoring chart in accordance with an embodiment of the present invention.

Also in block 104, limits for monitoring quantities may be determined based on typical ranges of values under NOC. Such a limit is called a NOC limit. A monitoring chart displays the monitoring quantities versus time. A NOC limit may be represented in the monitoring chart by a horizontal line. A monitoring result is the decision at any one time whether a quantity exceeds the limit (alert) or does not exceed the limit (normal or NOC). An example of a monitoring chart is illustrated in FIG. 7. The monitoring chart 700 plots a function of a NOC model applied to new data. The results of monitoring chart 700 may be fused or consolidated with results from multiple other charts based on other models, as described in more detail with respect to FIG. 5. The line 702 represents a limit based on conditions for the parameters collected under NOC.

In block 106, parameters collected from sensors coupled to the various systems may be monitored by calculating quantities from the collected parameter data and NOC models and comparing with NOC limits established in block 104 for NOC data. An example of calculating quantities will be described in more detail with reference to block 232 in FIG. 2B.

In block 108, monitoring results may be generated for a variety of principal component analysis (PCA) and independent component analysis (ICA) models. PCA is a dimension reduction technique that may be used to reduce the number of parameters for statistical analysis. PCA may reduce a multiplicity of different variables to a much smaller group that is still representative of the data. Both PCA and ICA model data as a linear combination of latent variables. Latent variables are variables that are not directly observed but are rather inferred, such as through the mathematical modeling of variables that are directly measured. PCA projects parameters onto a smaller set of latent variables that may account for most of the variation in the data set. The latent variables are uncorrelated and orthogonal. The latent variables are independent only if they have a Gaussian distribution. On the other hand, ICA decomposes the observed data into linear combinations of statistically independent components. ICA may be considered an extension of PCA since ICA may use PCA as an initial stage. Then, ICA searches for projections of the data that are most non-Gaussian. PCA is described in more detail in *A User's Guide to Principal Components* by J. E. Jackson, John Wiley and Sons, Inc. 1991. ICA is described in more detail in *Independent Component Analysis* by A. Hyvarinen et al., John Wiley and Sons, Inc. 2001.

In block 110 the monitoring results from block 108 may be fused or consolidated to produce a consensus decision, i.e. alert/normal on whether an anomaly is likely to occur. A monitoring result can be viewed as a decision, i.e., whether a monitoring quantity at a particular time exceeds the limit (alert) or not (normal). Because there can be many different types of monitored quantities, there may be different monitoring results.

In block 112, a determination may be made if the consensus decision is "alert". If so, an alert may be generated. If not, the parameters may continue to be monitored in block 114. If the limit is exceeded in block 112, the method 100 may advance to block 116.

In block 116, contribution plots may be generated in response to a consensus alert. Examples of contribution plots will be described with reference to FIGS. 8 and 9. Briefly, a contribution plot indicates the level of contribution of each parameter in causing a predetermined limit or NOC limit to be exceeded in a monitoring chart.

In block 118, which parameter or parameters are most likely to have caused the alert may be determined from the contribution plot or plots. This is done by comparing each parameter contribution to the monitored quantity, relative to the parameter contribution under baseline or normal operation conditions. Subject matter expertise about the relationships between the parameters and system components (parts) may help to determine which component needs to be replaced or repaired to avoid a future flight deck effect.

In block 120, the apparatus, aircraft or other equipment may be scheduled for maintenance to correct the anomaly causing the alert to avoid an anticipated future flight deck effect. Depending upon the system and/or analysis of the data or parameter observations, a notification may be generated to repair or check the system during the next routine maintenance or the aircraft may be pulled out of service earlier to avoid any undesirable flight operations or business effects.

Figure 2A:
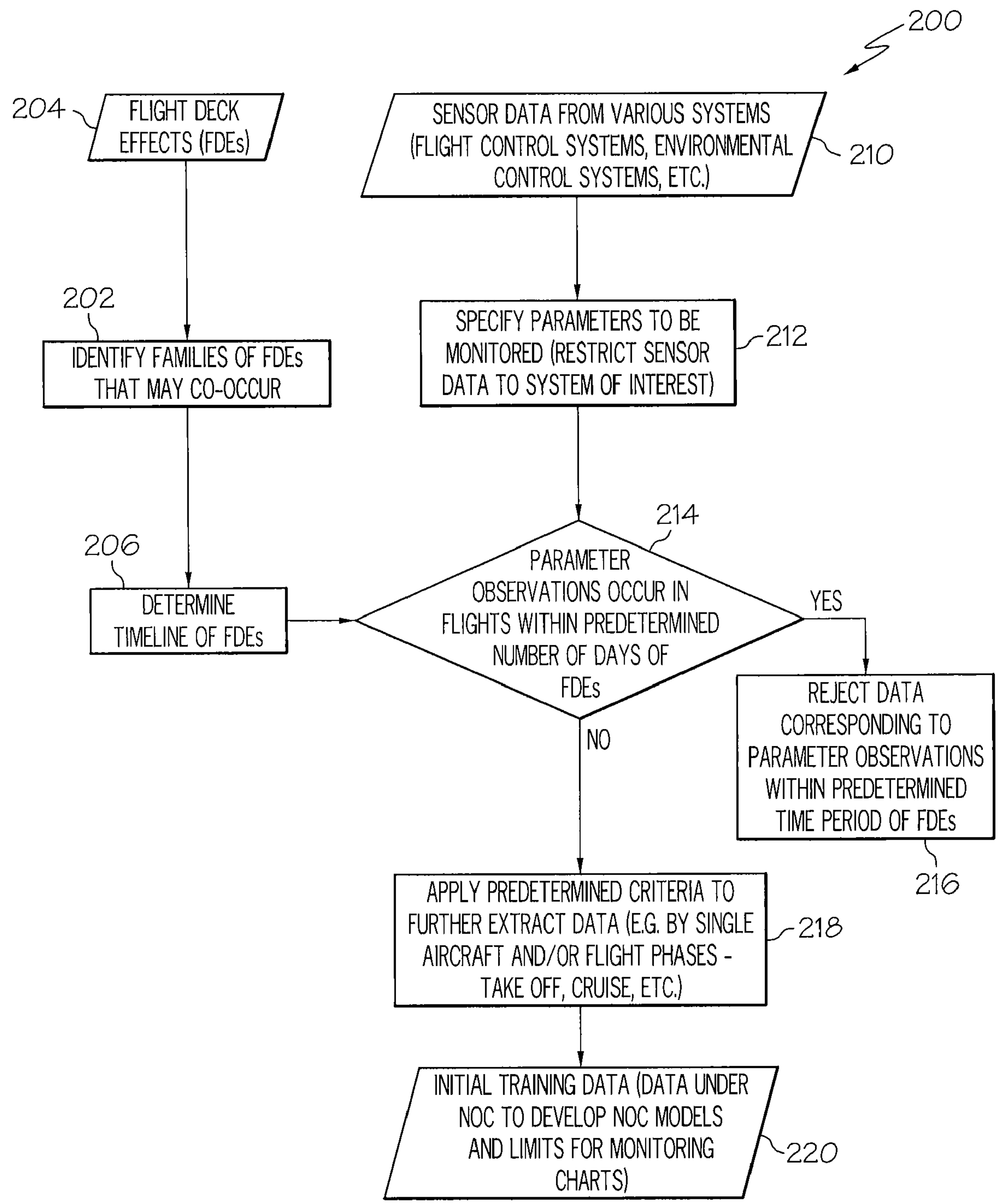
FIG. 2A is a flow chart of an example of a method to extract initial training data for data-driven anomaly detection in accordance with an embodiment of the present invention.

FIG. 2A is a flow chart of an example of a method 200 to extract initial training data or baseline data for data-driven anomaly detection in accordance with an embodiment of the present invention. In block 202, a subject matter expert may identify flight deck effects 204 that may co-occur. Any correlation between different flight deck effects 204 or anomalies in different aircraft systems may be identified. In block 206, a timeline of flight deck effects 204 of interest may be determined from the observed training data. Since the goal is extract a training set of data representing normal operating conditions (NOCs), data must be excluded from periods of time around these flight deck effects 204.

Sensor data 210 from various aircraft systems, e.g. flight control systems or environmental control systems may be collected. In block 212, selected parameters of interest that are to be monitored or observed may be specified. Accordingly, the sensor data 210 may be restricted to those systems of interest.

In block 214, a determination may be made as to whether any collected sensor data corresponding to a parameter of interest occurred within a predetermined time period of a flight deck effect 204. Any sensor data or parameter observations within the predetermined time period or number of days of a flight deck effect 204 are rejected in block 216 because this period of time is considered not under normal operating conditions.

Any data or parameter observations not occurring within the predetermined time period in block 214 are passed to block 218. In block 218, additional criteria may be applied to further extract data to produce the initial training data 220 based substantially on normal operating conditions. Examples of criteria may include extracting by a single aircraft rather than all aircraft; or for only certain flight phases, such as take off, cruise, or landing.

Figure 2B:
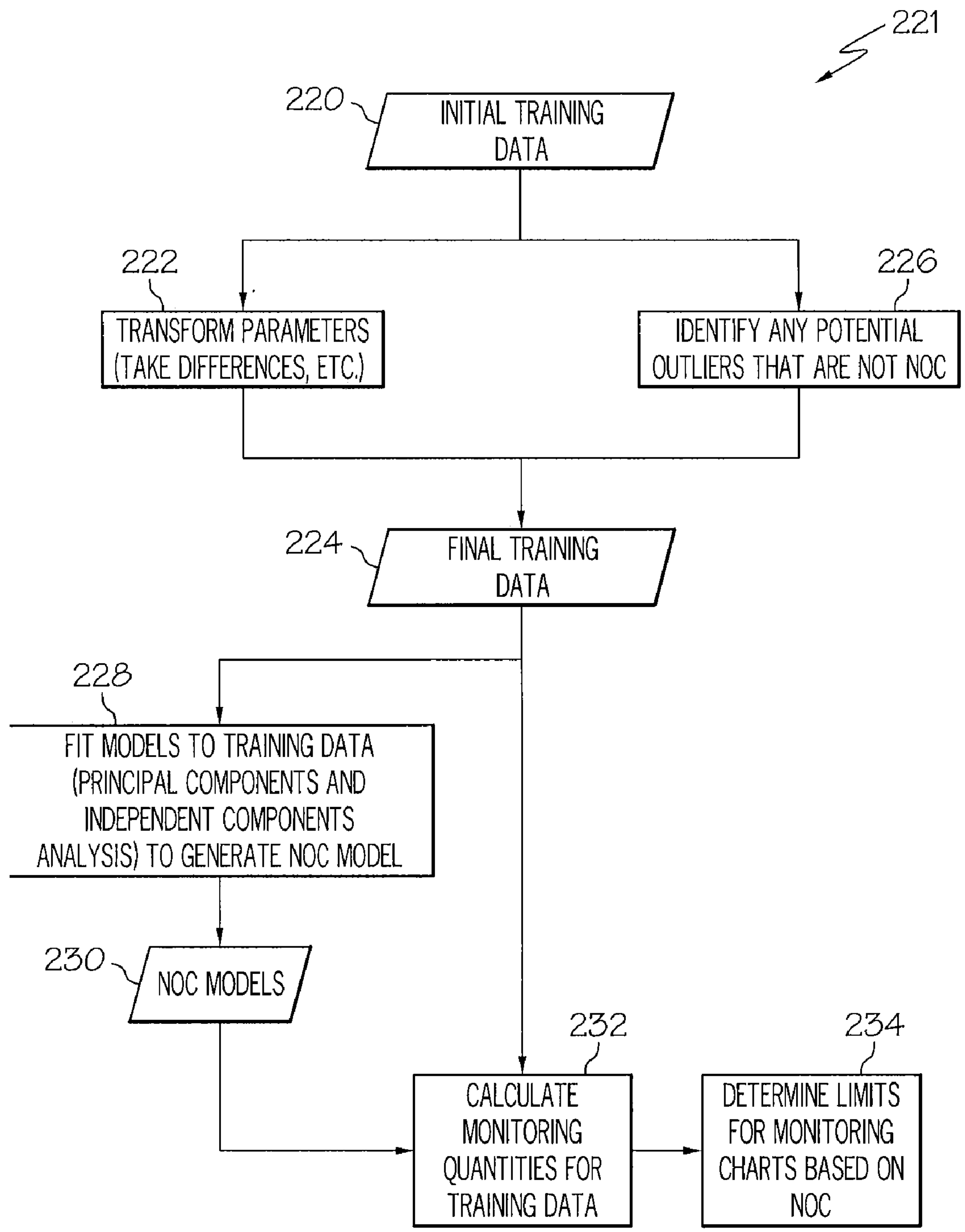
FIG. 2B is a flow chart of an example of a method to further define a set of data from normal operating conditions (NOCs), fit models, and determine limits for monitoring charts for data-driven anomaly detection in accordance with an embodiment of the present invention.

FIG. 2B is a flow chart of an example of a method 221 to extract the final training data, fit NOC models, and determine NOC limits for monitoring charts for data-driven anomaly detection in accordance with an embodiment of the present invention. In block 222, any transformation of the initial training data 220 to produce the final training data 224 may be performed. An example of such a transformation may be to calculate differences between naturally paired sensors, such as sensors controlling similar flight control elements on left and right sides of the aircraft.

In block 226, any potential outliers that are not NOC may be identified. An example of a method to detect and remove potential outliers will be described with reference to FIG. 3. Any potential outliers may be removed to produce the final training data 224.

While blocks 222 and 226 are shown in FIG. 2B as being in parallel, this does not necessarily mean that these operations have to occur simultaneously.

In block 228, models are fit to the final training data to generate NOC or baseline models 230. PCA and ICA, previously described, may be used to generate the NOC models 230.

In block 232, the final training data 224 and the NOC model 230 may be used to calculate monitoring quantities for the final training data. In general, there are two classes of quantities based on the model. One type of quantity represents a distance of a parameter to the center within a space spanned by the chosen number of components for the model. Another type of quantity is a residual-type quantity or squared prediction error, which represents the distance of the parameter observation to the model space. For example, for PCA, the $T^2$ monitoring quantity can be calculated by $$T^2 = \sum_{i=1}^{A} \frac{t_i^2}{s_{t_i}^2} \quad (1)$$

Where $s_{t_i}^2$ is the estimated variance of $t_i$, $t_i$ is the ith PC, and A is the number of PCs selected. If an event occurs which was not present in the training data used to develop the NOC PCA model, a new statistic is needed to complement $T^2$, i.e. the squared prediction error (SPE)

$$SPE = \sum_{i=1}^{k} (y_{new,i} - \hat{y}_{new,i})^2 \quad (2)$$

Where $\hat{y}_{new}$ is computed from the reference PCA model. This distance is the squared perpendicular distance of a new multivariate observation from the NOC model space and represents what the model does not capture about the observation. There are similar quantities for ICA.

In block 234, limits for the monitoring charts may be determined based on NOC. Traditional limits for PCA charts assume the data have a Gaussian distribution, but this is not true for airplane health applications. ICA components are necessarily non-Gaussian, because of the way they are chosen. In both cases, density estimation is used to set limits. The main challenge is to choose a smoothing parameter that determines the amount of nearby data used to determine the local density estimate. The smoothing parameter may be chosen using the Sheather-Jones method. The Sheather-Jones method is described in *Applied Smoothing Techniques for Data Analysis. The Kernel Approach with S-Plus Illustrations*, A. W. Bowman and A. Azzalini, Oxford University Press 1997. Because all quantities are strictly positive, the following method is applied: apply a log transformation to the data, construct the density estimate, and then transform result back to the original scale.

Figure 3:
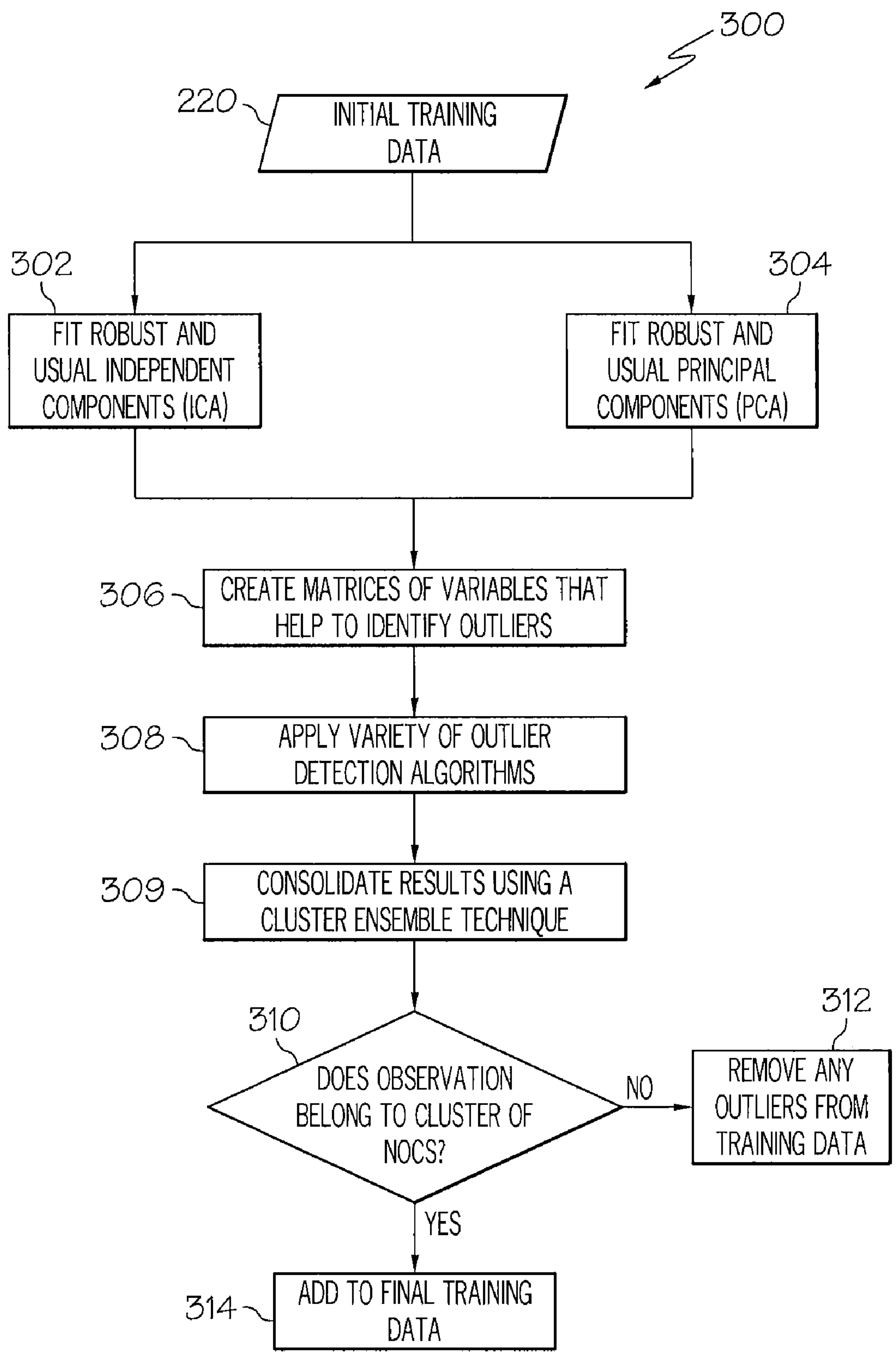
FIG. 3 is a flow chart of an example of a method to detect outliers in initial training data in accordance with an aspect of the present invention.
Figure 4:
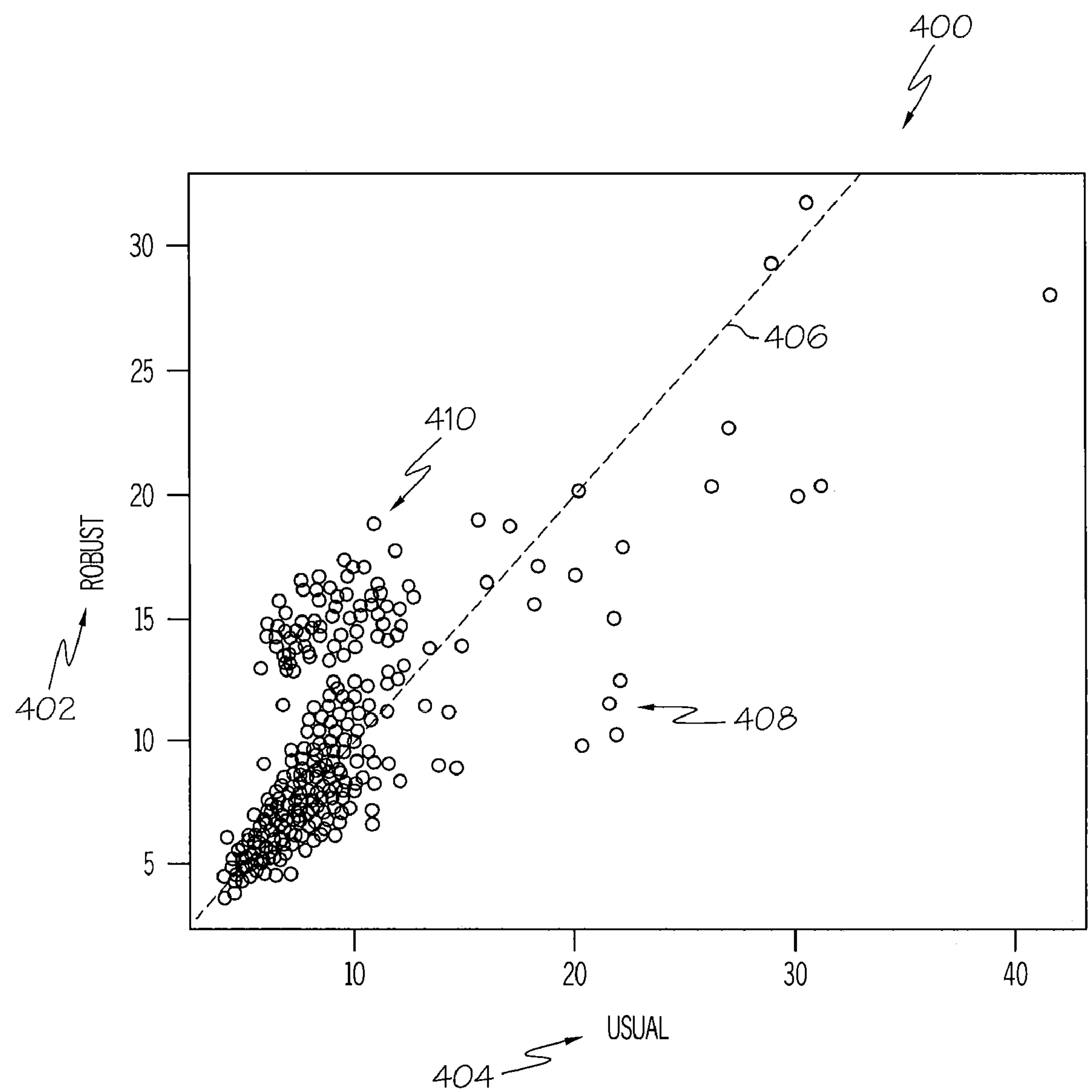
FIG. 4 is an example of a chart displaying an output from a method to detect outliers in accordance with an embodiment of the present invention.

FIG. 3 is a flow chart of an example of a method 300 to detect outliers in initial training data 220 in accordance with an aspect of the present invention. The method 300 may be used to perform the operation of block 226 in FIG. 2B. In block 302, robust and usual independent components are fit to the initial training data 220 using ICA similar to that previously described. In block 304, robust and usual principal components are fit to the initial training data using PCA similar to that previously described. Then monitoring quantities may be calculated using the robust and usual fits as described with reference to the remainder of method 300. If the quantities differ for an observation, that observation is a candidate for an outlier. FIG. 4 displays this graphically. FIG. 4 is an example of a chart 400 displaying an output or results of calculating the robust and usual fits to detect outliers in accordance with an embodiment of the present invention. In the results, robust distances 402 are plotted against usual distances 404. The robust distances 402 are determined from the robust principal components and the usual distances 404 are determined from the usual principal components. Deviations from the dotted diagonal line 406 indicate candidate outliers. Both scattered outlying observations 408 and a cluster of outlying observations 410 are illustrated in FIG. 4.

Referring back to FIG. 3, while blocks 302 and 304 are shown in parallel, these functions do not necessarily need to be performed simultaneously.

In block 306, matrices of variables are created that help to identify outliers. This could include a variety of quantities using the robust and usual fits from blocks 302 and 304. The matrices could also be lower dimension data, based on projecting the original data on varying numbers of components in PCA, ICA, or by random low dimensional projections.

In block 308, a variety of outlier detection algorithms may be applied to the matrices. These may include comparing robust with usual distances, clustering, and recursively applying monitoring charts. Outlier detection algorithms are known in the art.

In block 309, treat the output of the outlier detection algorithms as the result of two-cluster algorithms, and apply a cluster ensemble technique to combine results to achieve a consensus decision outlier/normal. In general, clustering algorithms determine structure within data by organizing it into groups or clusters. Many algorithms exist, but no single algorithm can handle all sorts of cluster shapes and structures. Each algorithm has its own bias and assumptions. Different clustering algorithms may partition a given data set differently. Even a single clustering algorithm may produce several partitions for different initializations or design parameters. In the past, the practice has been to apply various clustering procedures, then manually select an individual solution that maximizes a user-defined criterion. Instead of choosing one clustering algorithm, another approach is to combine clustering results to achieve a consensus clustering. Each algorithm will have different strengths and weaknesses, and the consensus clustering may be superior to that of the individual clusterings. Since outlier detection algorithms partition a data set into outliers/normal, this invention takes the novel step of applying the cluster ensemble methodology of generating a variety of partitions (or outlier/normal decisions) and then combining the results to reach a consensus decision. The advantage is that detecting outliers can be made more automatic and applicable to a variety of aircraft subsystems.

In block 310, a determination may be made if an observation belongs to a cluster of NOC. If not the observation may be removed from the training data as an outlier in block 312. In block 314, all remaining observations may be added to the final training data 224 in FIG. 2B.

Figure 5:
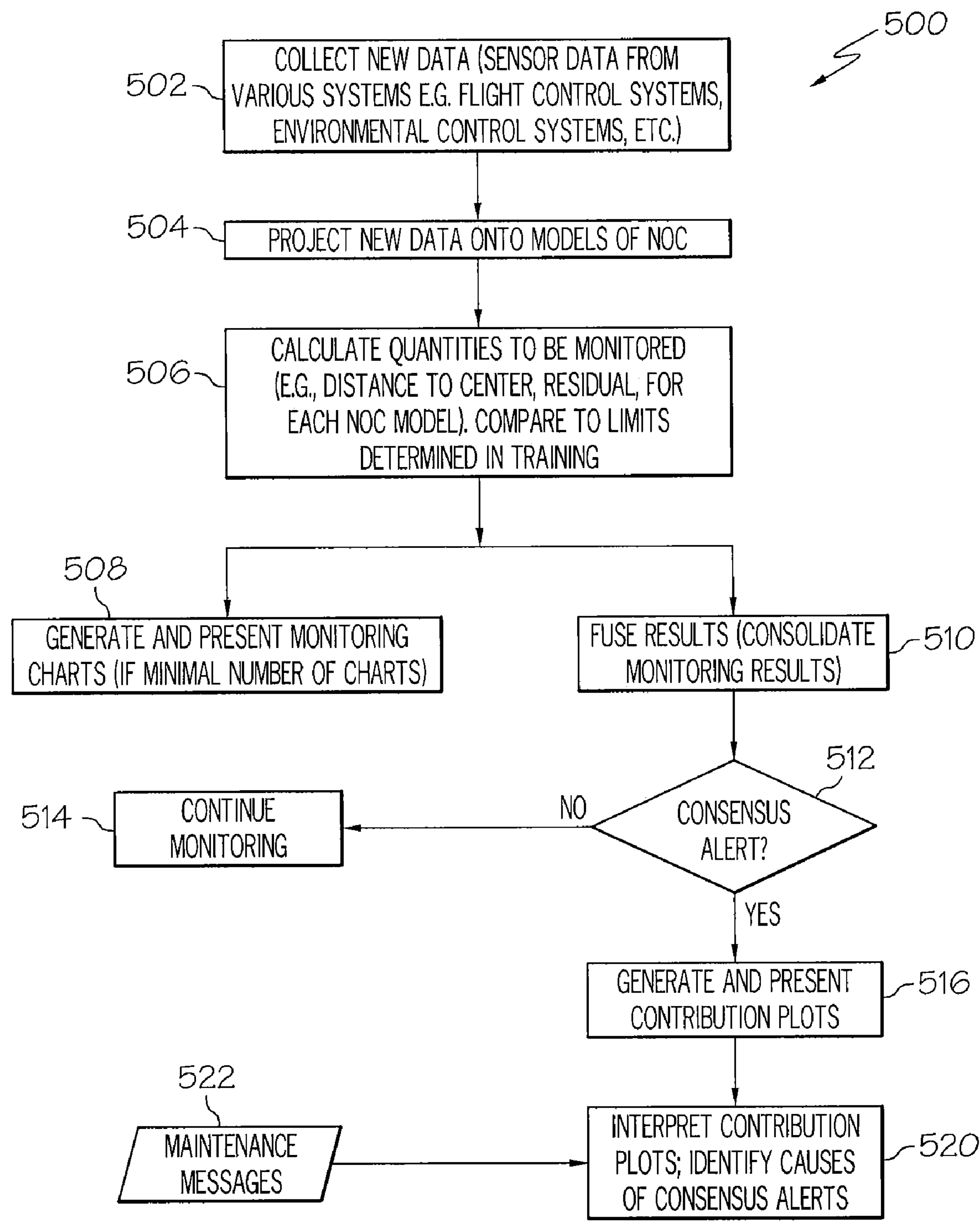
FIG. 5 is a flow chart of an example of a method to monitor data using data-driven anomaly detection in accordance with an embodiment of the present invention.

FIG. 5 is a flow chart of an example of a method 500 to monitor data for data-driven anomaly detection in accordance with an embodiment of the present invention. In block 502, new sensor data in contrast to initial training data may be collected. The new sensor data may arise from an aircraft system, such as flight control systems, environmental control systems or other systems.

In block 504, the new data may be projected onto models of NOC, such as models 230 developed in FIG. 2B. In block 506, quantities to be monitored may be calculated. Similar to that previously described with respect to calculating monitoring quantities for training data in block 232 of FIG. 2B, there are two classes of quantities based on the model. One type of quantity represents a distance of a parameter observation to a center within a space spanned by a chosen number of components. Another type of quantity is a residual or an orthogonal distance of the parameter observation to the model space. Thus the two types of quantities measure closeness of an observation to NOC according to what the NOC model describes, and in addition measures any left over distance that the model does not describe. These quantities can be compared to their corresponding limit determined earlier using baseline data. At any time point, if the quantity exceeds the limit, an alert is generated.

In block 508, monitoring charts may be generated and presented for each of PCA and ICA. The charts may represent the quantities' distance to center and residual as described above. The charts also show the limits, and so it can be readily seen which quantities exceed the limits. An alert occurs when the monitored quantity exceeds the predetermined limit based on NOC.

In block 510 monitoring results may be fused or consolidated to form a single consensus result, alert/no alert. An example of a method to fuse results will be described with reference to FIG. 6.

In block 512, a determination may be made if there is a consensus alert from the fused results. Since the fused results are a consolidation or fusion of multiple decisions, the alert may be referred to as a consensus alert. If a consensus alert has not occurred, the method 500 may advance to block 514. In block 514, the process may continue monitoring the next observation. If there is a determination in block 512 that there is a consensus alert, the method 500 may advance to block 516.

Figure 8:
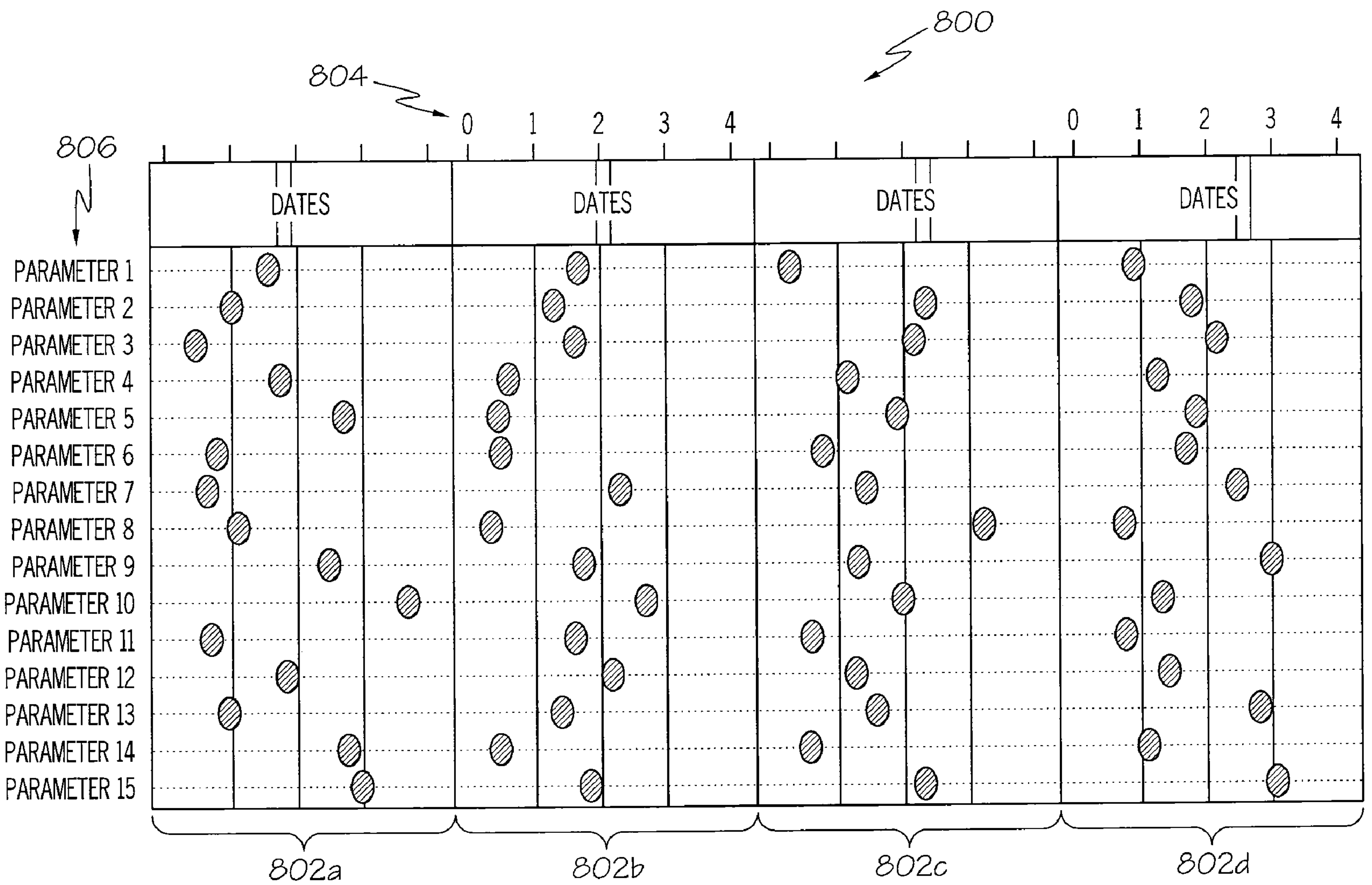
FIG. 8 is an illustration of an example of a contribution plot in accordance with an embodiment of the present invention.
Figure 9:
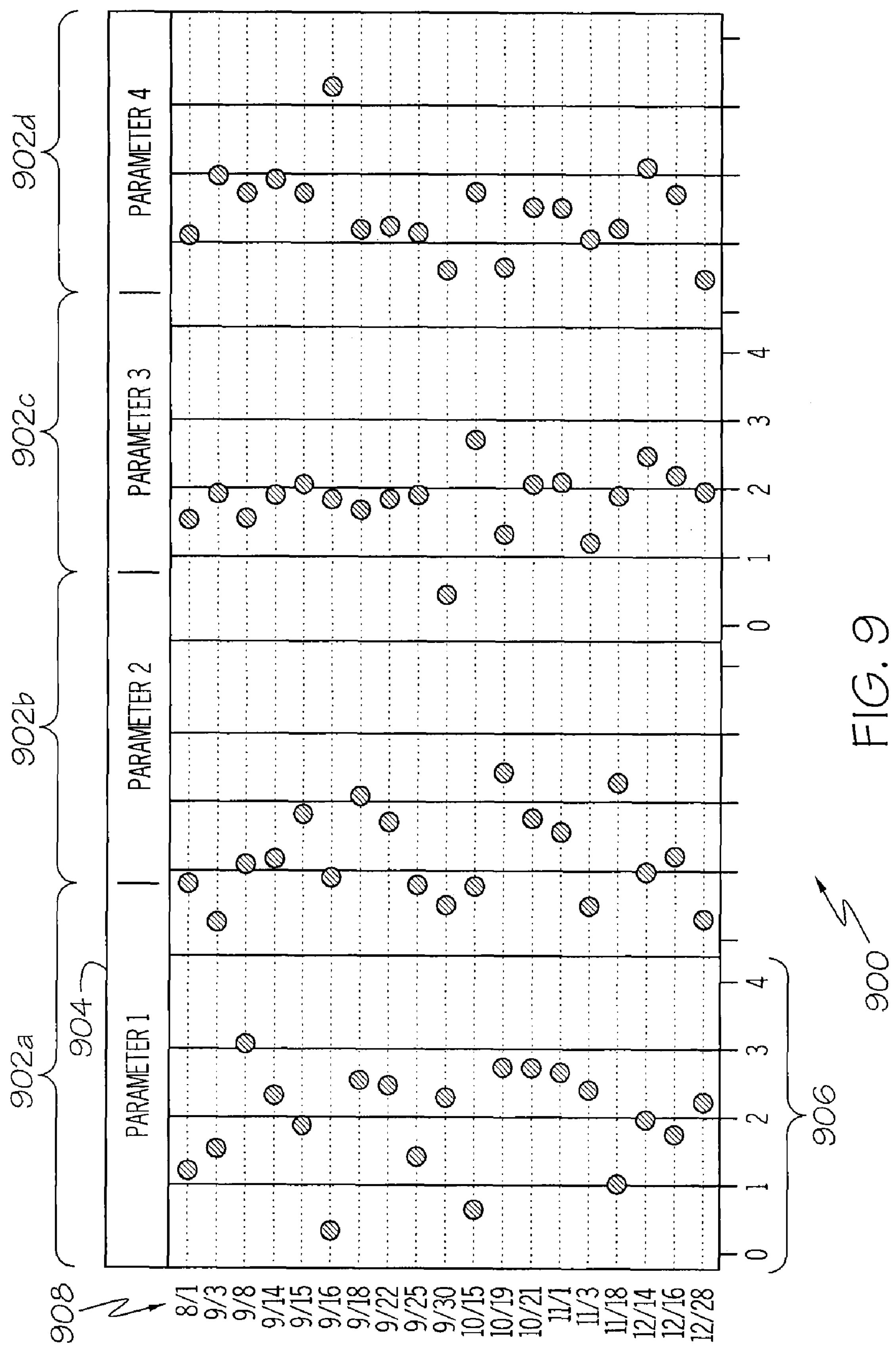
FIG. 9 is an illustration of an example of another contribution plot in accordance with an embodiment of the present invention.

In block 516, contribution plots may be generated and presented to allow further exploring why an alert occurred. What parameters are the likely causes of an alert may be determined from the contribution plots. Examples of contribution plots in accordance with an embodiment of the present invention are illustrated in FIGS. 8 and 9. FIG. 8 illustrates an example of a contribution plot 800 including a trellis of four contribution plots or sub-charts 802*a*-802*d*. Each sub-chart 802 or sub-plot illustrates a level 804 (0-4 in this example) of contribution for each different parameter 806 observed for each respective date, set of dates or occurrence. The numerals "0-4" may represent an increasing level of contribution by the parameter to causing the alert or exceeding NOC or baseline conditions. For example, contribution level "0-1" may represent a "small" contribution to causing the alert; contribution level "1-2" may represent a "moderate" contribution; contribution level "3-4" may represent a "high" contribution; and contribution level "4+" may represent an "extreme" contribution.

In the example illustrated in FIG. 8, for the specific date or dates corresponding to sub-chart 802*a*, parameter 10 had the highest level of contribution to causing the alert in the monitoring chart exceeding the predetermined NOC limit. Parameters 5, 9, 14, and 15 also had "high" levels of contribution. Accordingly, systems associated with these parameters may be checked to possibly correct any anomaly and to avoid a future flight deck effect.

FIG. 9 illustrates a contribution plot 900 including a trellis of four contribution plots or sub-charts 902*a*-902*d*. Each sub-chart 902 may correspond to a parameter 904 being monitored and illustrates a level 906 (0-4 in this example) of contribution for the parameter 904 on each date 908 that an alert was generated by a monitoring chart, such as limit 702 in monitoring chart 700 of FIG. 7. Similar to contribution plot 800, the numerals "0-4" may represent increasing levels of contribution by the parameter to causing the alert. For example, on 9/8, "Parameter 1" had a higher level of contribution than the other parameters.

Returning to FIG. 5, in block 520, the contribution plots may be interpreted with reference to any maintenance messages 522 to identify any causes of the consensus alert. Maintenance messages 522 are collected in addition to flight deck effects and sensor data and may be used to help interpret the contribution plots in block 520. Maintenance messages are messages or codes that may be generated by an aircraft system or system component which can be cross-referenced to identify any maintenance items or items warranting further attention.

Figure 6:
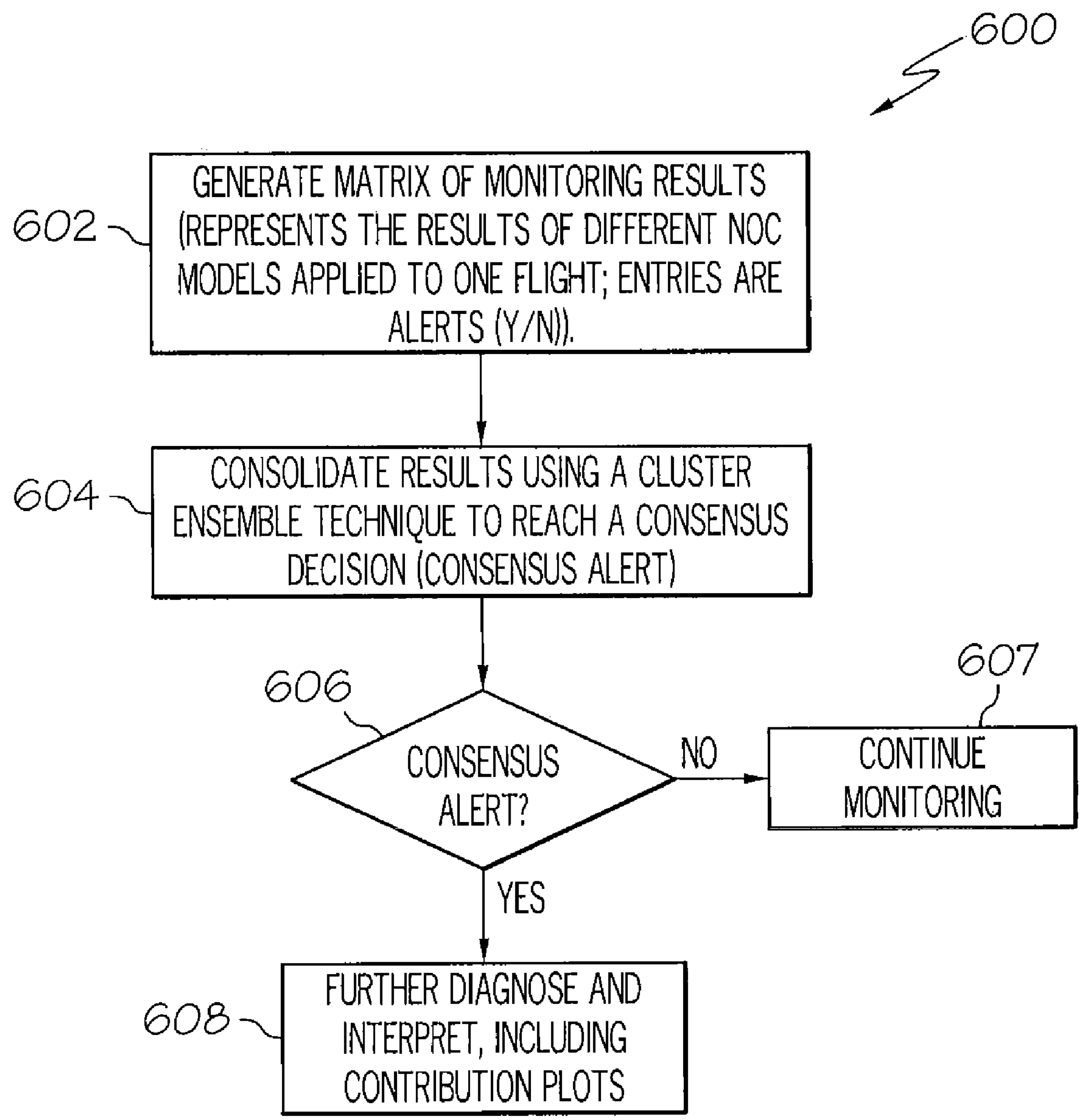
FIG. 6 is a flow chart of an example of a method to fuse or consolidate monitoring results for data-driven fault detection in accordance with another embodiment of the present invention.

FIG. 6 is a flow chart of an example of a method 600 to fuse or consolidate monitoring results for data-driven fault detection in accordance with another embodiment of the present invention. The method 600 may be used to perform the function of block 510 in FIG. 5. In block 602, a matrix of monitoring results may be generated. Each row of the matrix may represent the decision made by one NOC model. The two columns represent "alert" or "normal". The elements of the matrix may be either 0/1 indicating no/yes, or a number between 0 and 1 indicating the amount of evidence for an alert.

In block 604, a clustering ensemble methodology may be applied to the matrices of block 602 to reach a consensus decision or consensus alert. Blocks 602 and 604 together apply a clustering ensemble methodology similar to that described with respect to FIG. 4. Since monitoring algorithms partition a data set into alert/normal (or its fuzzy clustering equivalent), this invention takes the novel step of applying the cluster ensemble methodology of generating a variety of partitions (or alert/normal decisions) and then combining the results to reach a consensus decision. Partitions may be generated in a variety of ways, for example by using a PCA or ICA algorithm, by varying the number of components in each, or by using a Shewhart or an exponentially weighted moving average monitoring algorithm. The advantage of an ensemble approach is that monitoring becomes less dependent on these choices, and can be made more robust in that it combines the strengths of different monitoring approaches.

In block 606, a determination may be made if there is a consensus alert. If there is not a consensus alert in block 606, the method 600 may advance to block 607. In block 607, the system may continue to monitor the next observation. If there is a consensus alert block 606, the method 600 may advance to block 608. In block 608, further diagnosis of the reason for the alert may be performed. Contribution plots may be generated similar to that previously described with reference to FIGS. 8 and 9. Blocks 606 and 608 may correspond to blocks 512 and 516 in FIG. 5.

Figure 10:
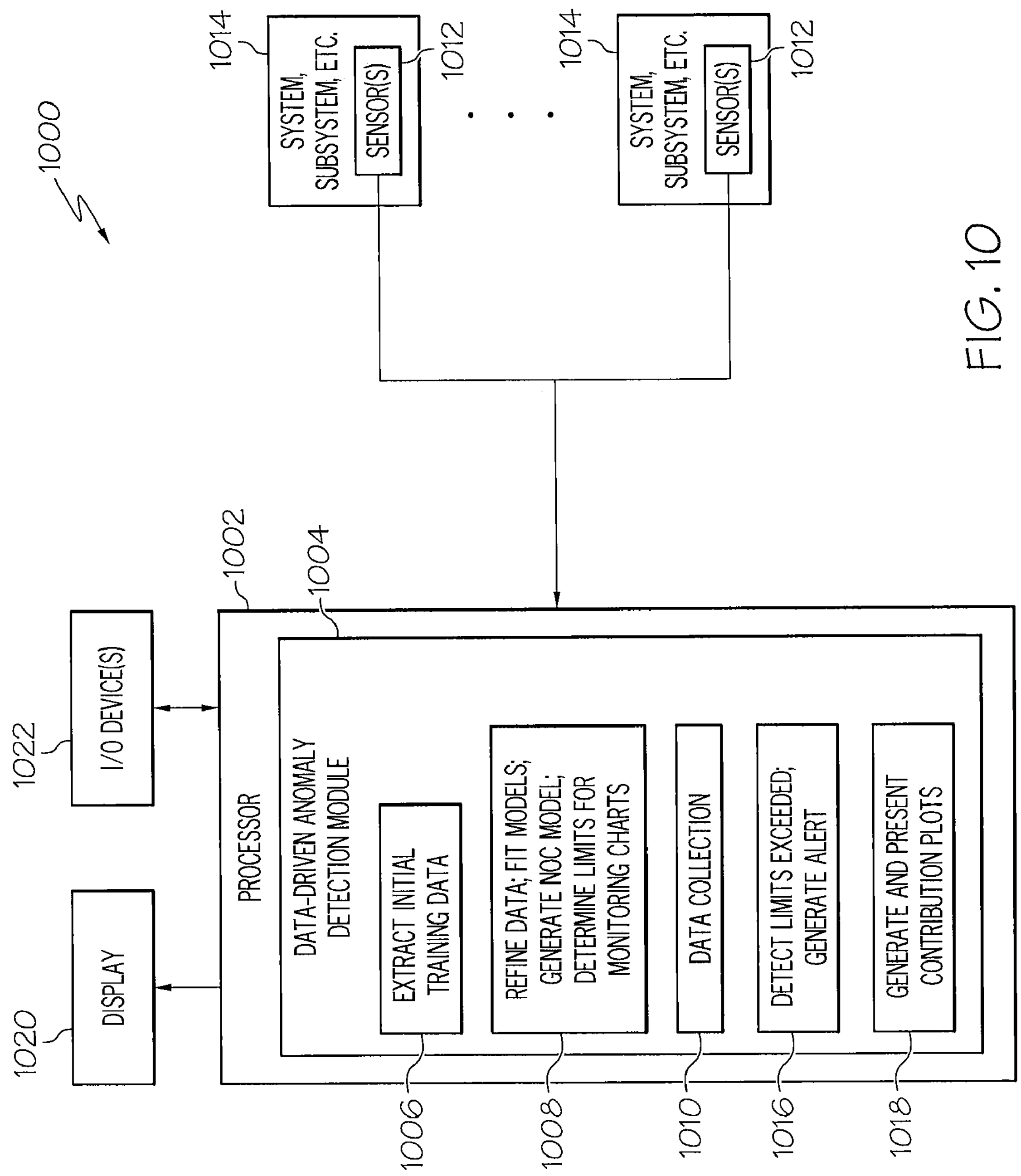
FIG. 10 is a block diagram of an example of a system for data-driven anomaly detection in accordance with an embodiment of the present invention.

FIG. 10 is a block diagram of an example of a system 1000 for data-driven anomaly detection in accordance with an embodiment of the present invention. The system 1000 may include a processor 1002. A data-driven anomaly detection module 1004 may be operable on the processor 1002. The methods 100, 200, 220, 300, 500, and 600 may be embodied in the data-driven anomaly detection module 1004. Accordingly, the data-driven module 1004 may include a unit to extract initial training data 1006. The unit 1006 may extract initial training data similar to that described with respect to the method 200 of FIG. 2A.

A unit 1008 to refine data, fit models, generate NOC models, determine limits for monitoring charts, and similar operations may also be provided. The unit 1008 may perform operations, such as those described with respect to methods 221 and 300 of FIGS. 2B and 3 respectively.

A data collection unit 1010 may collect sensor data from multiple sensors 1012 associated with various systems 1014 or subsystems forming an apparatus, such as an aircraft or other equipment.

The data-driven anomaly detection module 1004 may also include a unit 1016 to detect when NOC limits are exceeded by the collected sensor data and to generate an alert. The method 500 may be embodied in the unit 1016.

A unit 1018 to generate and present contribution plots may also be provided. The unit 1018 may generate and present contribution plots similar to those illustrated in FIGS. 8 and 9 on a display 1020.

The system 1000 may also include input devices, output devices, or combination input/output devices, collectively illustrated as I/O device(s) 1022 in FIG. 10. The display 1018 and I/O devices 1022 may permit control of the data-driven anomaly detection module. The display 1020 may also present the various monitoring charts and contribution plots for analysis by a user.

The system 1000 may be used with any type of device to detect anomalies for correction prior to any other operational effects, such as a flight deck effect if the system 1000 is adapted for use in an aircraft.

Figure 11:
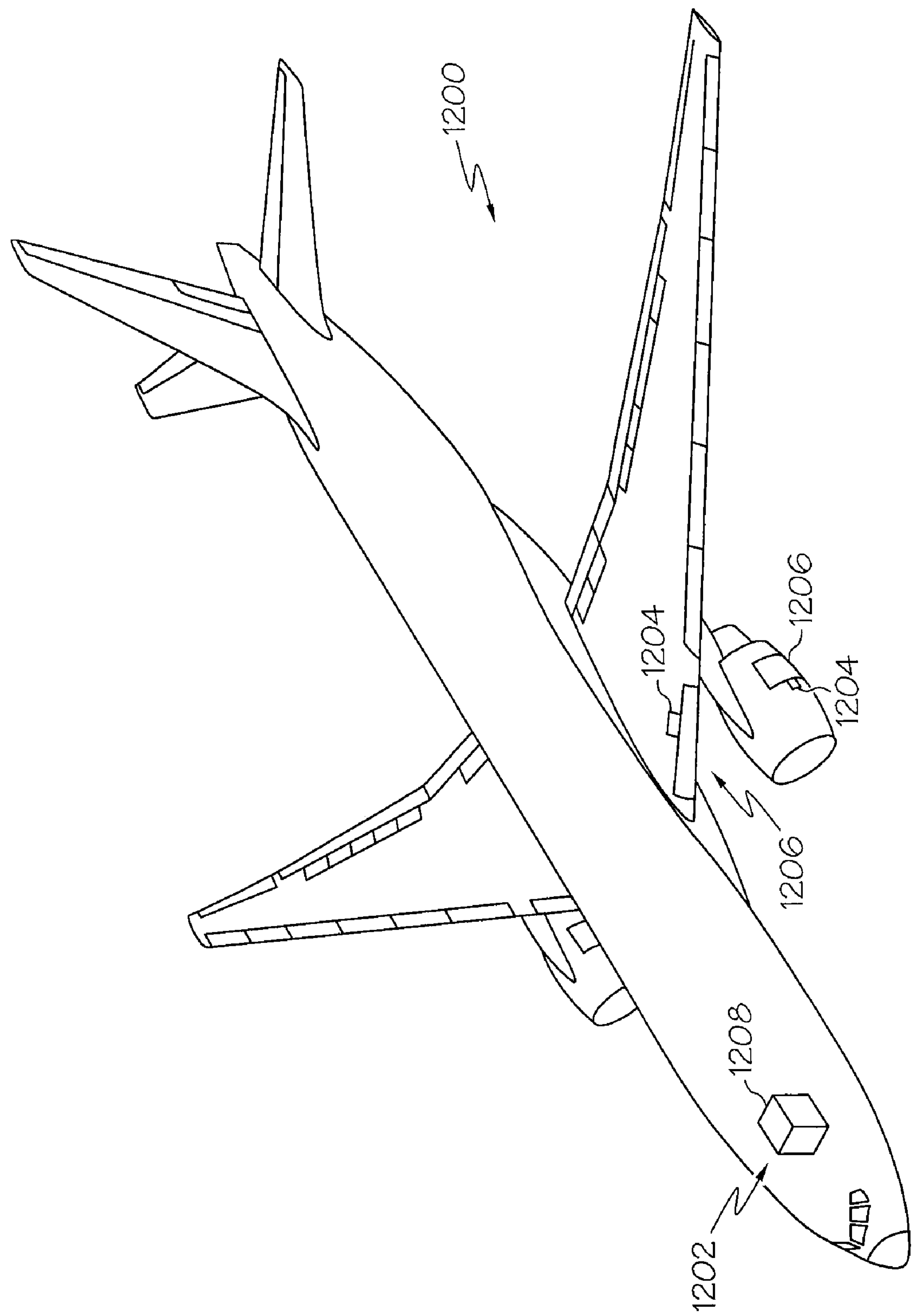
FIG. 11 is an illustration of an aircraft including a data-driven anomaly detection system in accordance with an embodiment of the present invention.

FIG. 11 is an illustration of an aircraft 1200 including a data-driven anomaly detection system 1202 in accordance with an embodiment of the present invention. The system 1202 may be similar to the data-driven anomaly detection system 1000 of FIG. 10. The system 1202 may include a multiplicity of sensors 1204 associated with different aircraft systems 1206 to collect and send sensor data to a data-driven anomaly detection module 1208 similar to module 1004 described with respect to FIG. 10. Examples of the different aircraft systems may include hydraulic systems, electrical systems, flight or environmental controls, engine associated systems, and the like. The data-driven anomaly detection system 1202 may detect anomalies similar to that described herein to predict or anticipate a flight deck effect before the effect happens so that corrective action may be taken to avoid the flight deck effect and possible grounding of the aircraft.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," and "includes" and/or "including" when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A method for data-driven anomaly detection, comprising:

monitoring, by a processor, a plurality of parameters associated with a plurality of subsystems of a system;

collecting, by the processor, data corresponding to each of the plurality of parameters from the plurality of subsystems;

generating, by the processor, monitoring quantities based on the data;

determining, by the processor, if any quantities in the monitoring quantities exceed a predetermined limit;

generating, by the processor, a contribution plot corresponding to each of the parameters in response to any of the quantities exceeding the predetermined limit;

determining, by the processor, which parameter is likely to cause an effect based on the contribution plot; and scheduling, by the processor, maintenance on the subsystem associated with the parameter that is likely to cause the effect prior to the effect occurring.

2. The method of claim 1, further comprising developing a normal operating conditions (NOC) model.

3. The method of claim 1, further comprising:

collecting sensor data from sensors sensing parameters related to operation of the plurality of subsystems;

generating initial training data from the collected sensor data, wherein the initial training data includes sensor data for selected parameters collected during normal operating conditions;

generating final training data from the initial training data by performing any transformations to the initial training data and identifying any potential outliers that are not normal operating conditions; and determining the predetermined limit for the monitoring quantities from the final training data.

4. The method of claim 3, further comprising:

using principal component analysis to reduce dimensionality of the initial training data;

using independent component analysis to model independent components of the initial training data;

creating a matrix of relevant variables to identify outliers;

applying a cluster ensemble to consolidate results of several outlier detection algorithms; and removing any outliers corresponding to parameter observations not belonging to a cluster of normal operating conditions to provide the final training data.

5. The method of claim 1, further comprising:

specifying a set of parameters to be monitored;

rejecting any sensor data corresponding to parameter observations within a predetermined time period of a specific event;

generating initial training data by extracting sensor data based on a predefined criteria;

transforming parameters to generate final training data;

identifying any potential outlier data that are not normal operating conditions to generate the final training data;

fitting models to the final training data to generate a NOC model;

calculating monitoring quantities for the final training data; and determining a limit for the monitoring quantities.

6. The method of claim 5, wherein rejecting any sensor data corresponding to parameter observations within a predetermined time period of a specific event comprises rejecting any sensor data within a predetermined time period of a flight deck event.

7. The method of claim 5, further comprising:

identifying any flight deck effects that may co-occur in an aircraft;

determining a timeline of the flight deck effects; and rejecting any sensor data corresponding to parameter observations within a predetermined time period of the flight deck effects.

8. The method of claim 1, further comprising:

projecting the collected data onto a model of normal operating conditions;

calculating a set of quantities to be monitored, wherein the set of quantities include a distance of a parameter observation to a center within a space spanned by a chosen number of components and an orthogonal distance of the parameter observation to the model space;

generating monitoring results which at each time determines whether the monitored quantity exceeds the predetermined limit;

fusing results to reach a consensus decision; and generating an alert if the consensus decision is an alert.

9. The method of claim 1, wherein generating a contribution plot comprises generating a sub-chart for each parameter showing a level of contribution over dates when any quantities in the monitoring chart exceed the predetermined limit.

10. The method of claim 1, wherein generating a contribution plot comprises generating a sub-chart for each date showing a level of contribution over the plurality of parameters when any quantities in the monitoring chart exceed the predetermined limit.

11. A method for data-driven anomaly detection, comprising:

statistically analyzing, by a processor, sensor data from a plurality of aircraft systems in relation to previously collected baseline sensor data from the plurality of aircraft systems; and detecting, by the processor, any anomalies based on the statistical analysis to permit correction prior to any flight deck effect, wherein any flight deck effect comprises an alarm or other indication on an instrument panel of an aircraft.

12. The method of claim 11, further comprising identifying a parameter most likely causing the anomaly from the statistical analysis.

13. The method of claim 11, wherein statistically analyzing performance data comprises multivariate process monitoring a plurality of parameters associated with the plurality of aircraft systems and correlating relationships between the different parameters.

14. The method of claim 13, further comprising generating an alert in response to at least one of a change in the relationship between any of the parameters or a change in a mean level of the parameters.

15. The method of claim 13, further comprising reducing the plurality of parameters associated with the plurality of aircraft systems for the multivariate process monitoring.

16. The method of claim 15, further comprising using principal component analysis to reduce the plurality of parameters.

17. The method of claim 15, further comprising using independent component analysis to decompose the data corresponding to the parameters into linear combinations of statistically independent components.

18. The method of claim 11, further comprising:

creating a baseline of training data sets of sensor data from the plurality of aircraft systems under normal operating conditions;

representing these data sets using empirical models including principal components and independent components;

projecting newly collected performance data into these models; generating monitoring quantities from the data;

generating an alert in response to a predetermined limit being exceeded by any quantities in the monitoring quantities;

generating contribution plots to indicate a level of contribution of each of the parameters to causing the alert.

19. A system for data-driven anomaly detection, comprising:

a processor;

a data collection unit to collect data from a plurality of subsystems of an apparatus; and a data-driven anomaly detection module operable on the processor, wherein the data-driven anomaly detection module statistically analyzes sensor data from the plurality of subsystems in relation to previously collected baseline performance data from the plurality of subsystems, and the module detects any anomalies based on the statistical analysis to permit correction prior to any operational effects associated with the apparatus, wherein any operational effects comprise an alarm or other indication on an instrument panel associated with the apparatus.

20. The system of claim 19, wherein the data-driven anomaly detection module comprises a multivariate process monitoring feature to monitor a plurality of parameters associated with the plurality of subsystems and to monitor relationships between the different parameters.

21. The system of claim 20, further comprising a limit detection and alarm generation unit to generate an alert in response to at least one of a change in the relationship between any of the parameters and a change in a mean level of an individual parameter.

22. The system of claim 20, further comprising a module to generate and present contribution plots, wherein the contribution plots comprise a level of contribution of each of the parameters to causing the alert.

23. An aircraft, comprising:

a plurality of aircraft systems, each aircraft system providing sensor data output; and a data-driven anomaly detection system to statistically analyze sensor data from the aircraft systems in relation to previously collected baseline sensor data from the aircraft systems, wherein the data-driven anomaly detection system detects any anomalies based on the statistical analysis to permit correction prior to any flight deck effects, wherein any flight deck effect comprises an alarm or other indication on an instrument panel of the aircraft.

24. The aircraft of claim 23, wherein the data-driven anomaly detection system comprises a multivariate process monitoring module to monitor a plurality of parameters associated with the aircraft systems and to correlate relationships between the different parameters.

25. The aircraft of claim 24, wherein the data-driven anomaly detection system comprises means for generating an alert in response to at least one of a change in the relationship between any of the parameters or a change in the mean level of parameters.

26. A computer program product for data-driven anomaly detection, the computer program product comprising:

a computer usable medium having computer usable program code embodied therewith, the computer usable medium comprising:

computer usable program code that when executed is configured to statistically analyze data from a plurality of subsystems of a system in relation to previously collected baseline data from the plurality of subsystems; and computer usable program code configured to detect any anomalies based on the statistical analysis to permit correction prior to any operational effects associated with the system, wherein any operational effects comprise an alarm or other indication on an instrument panel associated with the apparatus.

27. The computer program product of claim 26, further comprising computer usable program code configured to perform multivariate process monitoring of a plurality of parameters associated with the plurality of subsystems and correlating relationships between the different parameters.

28. The computer program product of claim 26, further comprising computer usable program code configured to generate an alert in response to at least one of a change in the relationship between any of the parameters and a change in a mean level of an individual parameter.

29. The computer program product of claim 26, further comprising:

computer usable program code configured to monitor a plurality of parameters associated with the plurality of subsystems of the system;

computer usable program code configured to collect data corresponding to each of the plurality of parameters from the plurality of subsystems;

computer usable program code configured to generate monitoring quantities based on the data;

computer usable program code configured to determine if any quantities exceed a predetermined limit based on the baseline data;

computer usable program code configured to generate a contribution plot corresponding to each of the parameters in response to any of the quantities exceeding predetermined limits; and computer usable program code configured to use contribution plots to determine which parameters are likely to cause an alert.

* * * * *